United States Patent
Nerl et al.

(10) Patent No.: US 7,308,638 B2
(45) Date of Patent: Dec. 11, 2007

(54) SYSTEM AND METHOD FOR CONTROLLING APPLICATION OF AN ERROR CORRECTION CODE (ECC) ALGORITHM IN A MEMORY SUBSYSTEM

(75) Inventors: John A. Nerl, Londonderry, NH (US); Ken Pomaranski, Roseville, CA (US); Gary Gostin, Plano, TX (US); Andrew Walton, Rocklin, CA (US); David Soper, Murphy, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 525 days.

(21) Appl. No.: 10/879,255

(22) Filed: Jun. 29, 2004

(65) Prior Publication Data

US 2005/0289439 A1    Dec. 29, 2005

(51) Int. Cl.
*G11C 29/00* (2006.01)
(52) U.S. Cl. ..................................... 714/763
(58) Field of Classification Search ................ 714/753, 714/763, 764, 746
See application file for complete search history.

(56) References Cited

U.S. PATENT DOCUMENTS 7,058,782 B2 *  6/2006  Henderson et al. ......... 711/170
7,096,407 B2 *  8/2006  Olarig ........................ 714/768

OTHER PUBLICATIONS

S. Kaneda and E. Fujiwara; "Single Byte Error Correcting-Double Byte Error Detecting Codes for Memory Systems," IEEE Transactions on Computers, vol. C-31, No. 7, Jul. 1982.

* cited by examiner

*Primary Examiner*—Shelly A Chase

(57) ABSTRACT

In one embodiment, a computer readable medium comprises code for recording occurrences of data corruption in data retrieved from a memory subsystem, code for determining whether bit locations within the memory subsystem are associated with multiple occurrences of data corruption, code for deallocating, in response to the code for determining, memory regions containing bit locations associated with multiple occurrences of data corruption, code for analyzing patterns of data corruption repeated across multiple addresses of the memory subsystem, and code for controlling application of an error correction code (ECC) algorithm by the memory subsystem to erase bits associated with a repeated bit pattern, detected by the code for analyzing, from data retrieved from the memory subsystem.

31 Claims, 4 Drawing Sheets

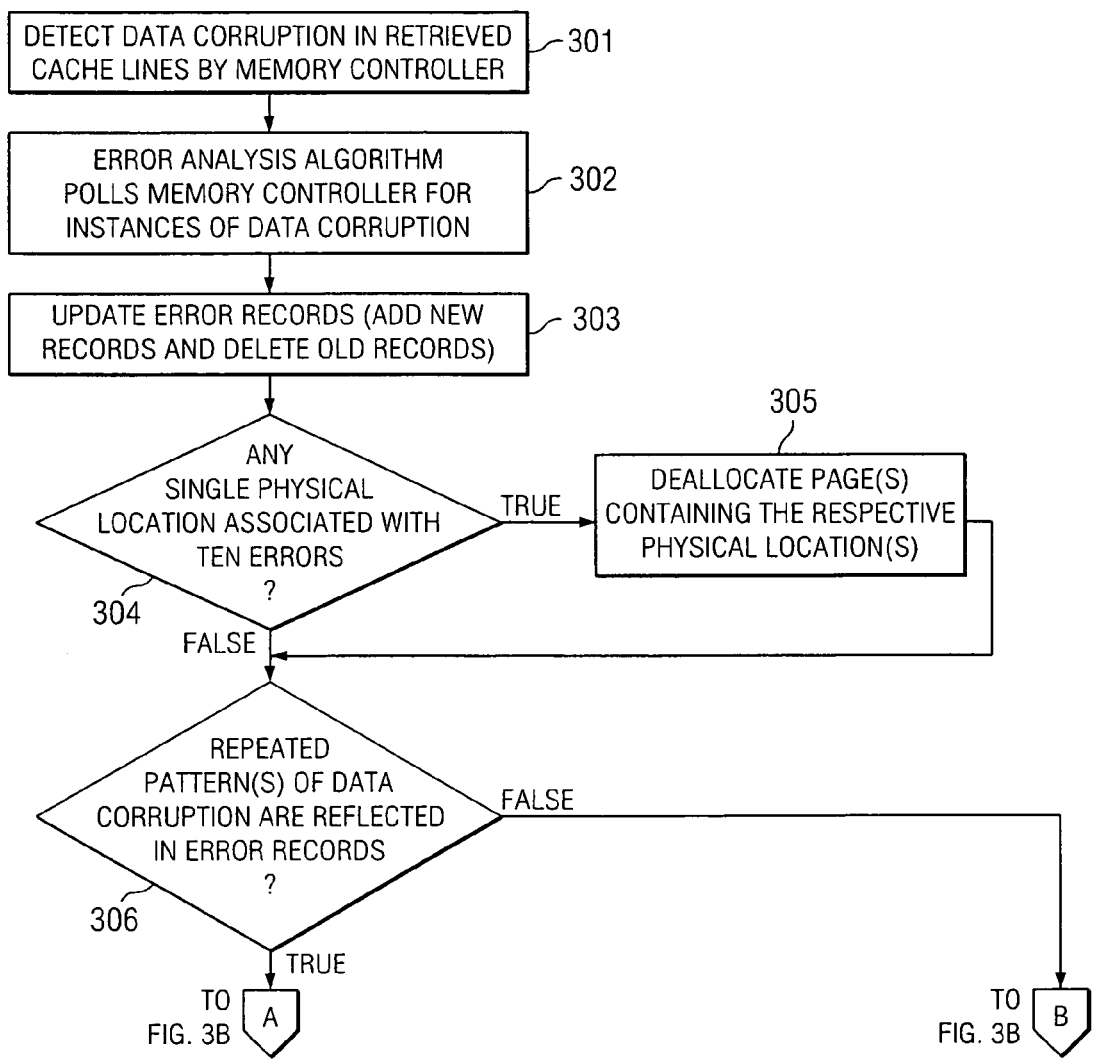

SYSTEM AND METHOD FOR CONTROLLING APPLICATION OF AN ERROR CORRECTION CODE (ECC) ALGORITHM IN A MEMORY SUBSYSTEM

CROSS-REFERENCE TO RELATED APPLICATION(S)

The present application is related to U.S. patent application Ser. No. 10/435,150, filed May 9, 2003, entitled "SYSTEMS AND METHODS FOR PROCESSING AN ERROR CORRECTION CODE WORD FOR STORAGE IN MEMORY COMPONENTS," which is incorporated herein by reference; this application is also related to concurrently filed and commonly assigned U.S. patent application Ser. No. 10/879,262, entitled "SYSTEM AND METHOD FOR CONTROLLING APPLICATION OF AN ERROR CORRECTION CODE (ECC) ALGORITHM IN A MEMORY SUBSYSTEM," and U.S. patent application Ser. No. 10/879,643, entitled "SYSTEM AND METHOD FOR APPLYING ERROR CORRECTION CODE (ECC) ERASURE MODE AND CLEARING RECORDED INFORMATION FROM A PAGE DEALLOCATION TABLE," which are incorporated herein by reference.

DESCRIPTION OF RELATED ART

Electronic data storage utilizing commonly available memories (such as dynamic random access memory (DRAM)) can be problematic. Specifically, there is a probability that, when data is stored in memory and subsequently retrieved, the retrieved data will suffer some corruption. For example, DRAM stores information in relatively small capacitors that may suffer a transient corruption due to a variety of mechanisms. Additionally, data corruption may occur as the result of hardware failures such as loose memory modules, blown chips, wiring defects, and/or the like. The errors caused by such failures are referred to as repeatable errors, since the same physical mechanism repeatedly causes the same pattern of data corruption.

A variety of error detection and error correction mechanisms have been developed to mitigate the effects of data corruption. For example, error detection and correction algorithms may be embedded in a number of components in a computer system to address data corruption. Frequently, ECC algorithms are embedded in memory controllers such as coherent memory controllers in distributed shared memory architectures.

In general, error detection algorithms employ redundant data added to a string of data. The redundant data is calculated utilizing a check-sum or cyclic redundancy check (CRC) operation. When the string of data and the original redundant data is retrieved, the redundant data is recalculated utilizing the retrieved data. If the recalculated redundant data does not match the original redundant data, data corruption in the retrieved data is detected.

Error correction code (ECC) algorithms operate in a manner similar to error detection algorithms. When data is stored, redundant data is calculated and stored in association with the data. When the data and the redundant data are subsequently retrieved, the redundant data is recalculated and compared to the retrieved redundant data. When an error is detected (e.g, the original and recalculated redundant data do not match), the original and recalculated redundant data may be used to correct certain categories of errors. An example of a known ECC scheme is described in "Single Byte Error Correcting-Double Byte Error Detecting Codes for Memory subsystems" by Shigeo Kaneda and Eiji Fujiwara, published in IEEE TRANSACTIONS on COMPUTERS, Vol. C31, No. 7, July 1982.

SUMMARY

In one embodiment, a computer readable medium comprises code for recording occurrences of data corruption in data retrieved from a memory subsystem, code for determining whether bit locations within the memory subsystem are associated with multiple occurrences of data corruption, code for deallocating, in response to the code for determining, memory regions containing bit locations associated with multiple occurrences of data corruption, code for analyzing patterns of data corruption repeated across multiple addresses of the memory subsystem, and code for controlling application of an error correction code (ECC) algorithm by the memory subsystem to erase bits associated with a repeated bit pattern, detected by the code for analyzing, from data retrieved from the memory subsystem.

In another embodiment, a method for controlling application of an error correction code (ECC) algorithm in a memory subsystem comprises maintaining records of data corruption associated with retrieval of data from the memory subsystem, identifying bit locations, using the records, having multiple instances of data corruption, deallocating memory regions of the memory subsystem containing bit locations identified as having multiple instances of data corruption, analyzing the records to detect patterns of data corruption repeated across multiple addresses of the memory subsystem, and applying an erasure mode of the ECC algorithm to erase bits retrieved from the memory subsystem associated with repeated patterns of data corruption.

In another embodiment, a system comprises memory controller means for storing and retrieving cache lines from memory, the memory controller applying an error correction code (ECC) algorithm to data retrieved from the memory, wherein the ECC algorithm corrects at least one transient error of a cache line and, in an erasure mode, at least one repeatable error of the cache line in addition to the transient error, means for recording occurrences of errors in retrieved cache lines detected by the memory controller means, means for identifying bit locations in the memory that have exhibited multiple errors, means for deallocating memory regions in response to the means for identifying, means for detected patterns of data corruption repeated across multiple addresses of the memory, and means for activating the erasure mode of the memory controller means to erase a pattern of data corruption in response to the means for detecting.

BRIEF DESCRIPTION OF THE DRAWINGS

FIGS. 3A and 3B depict a flowchart for analyzing data corruption to selectively enable an erasure mode according to one representative embodiment.

DETAILED DESCRIPTION

Figure 1:
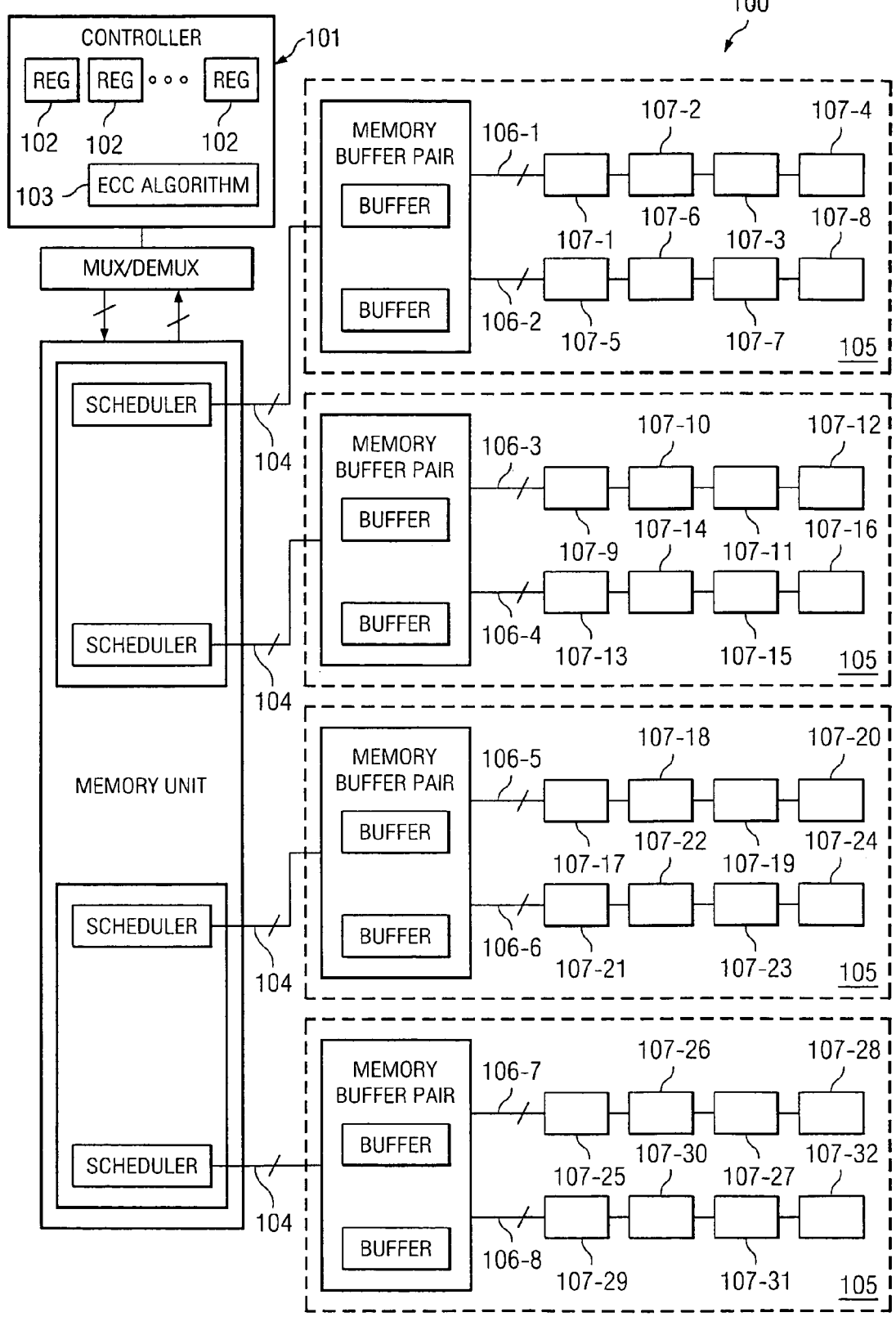
FIG. 1 depicts a memory subsystem that performs data storage using a selectively enabled erasure mode according to one representative embodiment.

Some representative embodiments of the present invention are directed to employing an ECC algorithm within a memory subsystem to provide increased reliability of the memory subsystem. In one representative embodiment, the ECC algorithm enables multiple "single-byte" errors to be corrected within a single cache line. A single-byte error refers to corruption of any number of bits within eight adjacent bits of a cache line aligned according to eight-bit boundaries. The correctable errors may be transient single-byte errors. Moreover, some representative embodiments enable correction of repeatable errors within a single cache line in addition to the correction of transient errors. The repeatable errors may be caused by a failing DRAM part, a memory interconnect malfunction, a memory interface logic malfunction, and/or the like. The correction of a repeatable error occurs according to an "erasure" mode. "Erasing" refers to decoding an ECC code word by assuming that an identified bit or bits are corrupted. The erasure mode is activated by loading a register in a memory controller with a suitable value to identify the location of the repeatable error.

When the erasure mode is activated, performance issues are raised. The additional processing associated with the erasure mode causes memory transactions to consume additional time. Also, the probability of decoding an uncorrectable error as correctable is increased due to the mathematical properties of the ECC algorithm. Even though the increased probability is relatively small, the probability is not insignificant in relatively large memory subsystems.

To address the performance issues associated with the erasure mode, some representative embodiments employ memory deallocation operations to address occurrences of data corruption in addition to erasure mode processing. Memory deallocation may occur using memory page constructs. A memory page refers to a contiguous block of memory addresses for which a virtual to physical mapping can be created by an operating system. In this context, "virtual" refers to the central processing unit (CPU) visibility of the memory and "physical" refers to the hardware visibility of the memory. A change in the mapping enables a new block of physical memory to be substituted for a failing block of physical memory without affecting the view of the virtual addresses as seen by the CPU. When multiple errors are observed at the same physical address at the bit level over an appropriate time frame, the page containing that physical address is deallocated according to some representative embodiments. Specifically, within the given time frame, the probability of multiple transient errors occurring at the same physical bit or bits is very low. Accordingly, it can be inferred that the observation of multiple errors results from a hardware issue. Page deallocation will prevent additional memory transactions from occurring using the potentially defective hardware component(s). By preventing use of the potentially defective memory addresses in an efficient manner, the probability of an unrecoverable error occurring during the retrieval of a cache line is reduced.

If a repeatable error is limited to a specific address or small number of addresses, page deallocation remedies the hardware issue in an efficient manner. Moreover, page deallocation does not invoke the performance limitations associated with the erasure mode processing. However, if a repeatable error is associated with a memory component (e.g., a bus or a memory rank) that is common to a larger number of addresses, page deallocation is problematic. Specifically, the amount of memory that is deallocated becomes quite large relatively quickly. Deallocated memory reduces the amount of memory available for supported CPU(s). Furthermore, deallocated memory may exceed the capacity of the operating system resources and other resources used to manage the deallocation functionality thereby causing the system to cease operations.

Some representative embodiments prevent page deallocation functionality from affecting system performance by efficiently invoking erasure mode processing using a suitable software algorithm. The software algorithm analyzes the occurrences of data corruption to identify repeated bit patterns. If a repeated bit pattern is identified, the software algorithm correlates the occurrence of data corruption to a particular "domain" (a particular level and/or a particular component) of the memory subsystem. If a sufficient number of occurrences of data corruption have been detected as originating from the particular domain according to the same pattern of data corruption, the software algorithm activates the erasure mode for the domain of the memory subsystem. Specifically, multiple occurrences of data corruption across a domain indicates that the underlying hardware issue is related to a higher-level memory component. Accordingly, the underlying hardware issue can be better remedied through application of the erasure mode processing. The software algorithm may activate the erasure mode by setting appropriate registers of the memory controller of the memory subsystem. The memory subsystem responds by decoding ECC code words from the domain of the memory subsystem by assuming that the identified bits within the ECC code words are corrupted. By decoding ECC code words in this manner, no further page deallocation operations will occur for the respective repeatable error.

Referring now to the drawings, FIG. 1 depicts memory subsystem 100 that performs data storage using a selectively enabled erasure mode according to one representative embodiment. Memory subsystem 100 includes memory controller 101 (e.g., a cache coherency controller). Memory controller 101 manages the storage and retrieval of cache lines to and from the hierarchical arrangement of memory components in memory subsystem 100. Specifically, memory subsystem 100 includes a plurality of memory quadrants 105 that are accessible by respective buses 104. As shown in FIG. 1, each memory quadrant 105 includes two DRAM buses 106 (shown collectively as 106-1 through 106-8) to enable access to eight memory ranks 107 (shown collectively as memory ranks 107-1 through 107-32). Each rank 107 includes a plurality of discrete DRAM banks (not shown) as well known in the art. The plurality of ranks 107 may be implemented by two dual-in-line memory modules (DIMMs). In one representative embodiment, a cache line is stored across a respective rank 107 to facilitate correction of single-byte errors.

Memory controller 101 includes ECC logic 103 to append ECC redundancy bits to cache lines during storage and to utilize the ECC redundancy bits to perform error detection and correction upon retrieval of cache lines. The ECC redundancy bits may be used to address transient errors. Also, the ECC redundancy bits may be used to address repeatable errors. Specifically, malfunctions of various components may cause repeatable errors for selected memory addresses and have no effect on other memory addresses. For example, a wire within DRAM bus 106-1 may exhibit intermittent failure. Cache lines retrieved from ranks 107-1 through 107-4 will exhibit, from time to time, a repeated error for the bit associated with the failing wire. However, cache lines retrieved from ranks 107-5 through 107-32 will not experience a corresponding error at the same bit location. Registers 102 of controller 101 are used by ECC logic 103 to apply the erasure mode of the ECC algorithm to data retrieved from the specific portion of memory subsystem 100 affected by a detected component failure. Hereinafter, the term "domain" shall be used to refer to any portion of the memory subsystem to which the erasure mode ECC processing may be applied independently of the remaining portion of the memory subsystem.

To correct repeatable errors according to an erasure mode in addition to transient errors, ECC logic 103 may utilize a suitable Reed-Solomon burst error correction code to perform single-byte correction. In Reed-Solomon algorithms, the code word consists of n m-bit numbers: $C=(c, c_{n-2}, \ldots, c_o)$. The code word may be represented mathematically by the following polynomial of degree n with the coefficients (symbols) being elements in the finite Galios field $(2^m)$: $C(x)=(cx^{n-1}+C_{n-2}x^{n-2} \ldots +c_o)$. The code word is generated utilizing a generator polynomial (typically denoted by $g(x)$). Specifically, the payload data (denoted by $u(x)$) is multiplied by the generator polynomial, i.e., $C(x)=x^{n-k}u(x)+[x^{n-k}u(x)\mod(g(x))]$ for systematic coding. Systematic coding causes the original payload bits to appear explicitly in defined positions of the code word. The original payload bits are represented by $x^{n-k}u(x)$ and the redundancy information is represented by $[x^{n-k}u(x)\mod(g(x))]$.

When the code word is subsequently retrieved from memory, the retrieved code word may suffer data corruption due to a transient failure and/or a repeatable failure. The retrieved code word is represented by the polynomial $r(x)$. If $r(x)$ includes data corruption, $r(x)$ differs from $C(x)$ by an error signal $e(x)$. The redundancy information is recalculated from the retrieved code word. The original redundancy information as stored in memory and the newly calculated redundancy information are combined utilizing an exclusive-or (XOR) operation to form the syndrome polynomial $s(x)$. The syndrome polynomial is also related to the error signal. Using this relationship, several algorithms may determine the error signal and thus correct the errors in the corrupted data represented by $r(x)$. These techniques include error-locator polynomial determination, root finding for determining the positions of error(s), and error value determination for determining the correct bit-pattern of the error(s). For additional details related to recovery of the error signal $e(x)$ from the syndrome $s(x)$ according to Reed-Solomon burst error correction codes, the reader is referred to THE ART OF ERROR CORRECTING CODES by Robert H. Morelos-Zaragoza, pages 33-72 (2002), which is incorporated herein by reference.

Erasures in error correction codes are specific bits or specific strings of bits that are known to be potentially corrupted without resorting to the ECC functionality. For example, specific bits may be identified as being potentially corrupted due to a constant or intermittent hardware failure such as a malfunctioning DRAM component, a wire defect, and/or the like. Introduction of erasures into the ECC algorithm is advantageous, because the positions of the potentially corrupted bits are known. Let d represent the minimum distance of a code, v represent the number of errors, and µ represent the number of erasures contained in a received ECC code word. Then, the minimum Hamming distance between code words is reduced to at least d−µ in the non-erased portions. It follows that the error-correcting capability is $[(d-µ-1)/2]$ and the following relation is maintained: $d>2v+µ$. Specifically, this inequality demonstrates that for a fixed minimum distance, it is twice as "easy" to correct an erasure as it is to correct a randomly positioned error.

In one representative embodiment, ECC logic 103 of memory controller 101 may implement the decoding procedure of a [36, 33, 4] shortened narrow-sense Reed-Solomon code (where the code word length is 36 symbols, the payload length is 33 symbols, and the Hamming distance is 4 bits) over the finite Galios field $(2^8)$. The finite Galios field defines the symbol length to be 8 bits. By adapting ECC logic 103 in this manner, the error correction may occur in two distinct modes. In a first mode, ECC logic 103 performs single-byte correction. In the second mode (the erasure mode), a byte location (or locations) is specified in the ECC code word as an erasure via a register setting. The location is identified by a software or firmware process as a repeatable error caused by a hardware failure. ECC logic 103 decodes the retrieved data by assuming that the single-byte associated with the identified erasure is corrupted. Because the minimum Hamming distance is reduced, ECC logic 103 enables the entire cache line to be recovered even when another (e.g., a transient) single-byte error is present in addition to the erasure error.

Additional details regarding a hardware implementation of the ECC algorithm employing a selectively enabled erasure mode in a memory subsystem may be found in U.S. patent application Ser. No. 10/435,150 entitled "SYSTEMS AND METHODS FOR PROCESSING AN ERROR CORRECTION CODE WORD FOR STORAGE IN MEMORY COMPONENTS."

Figure 2:
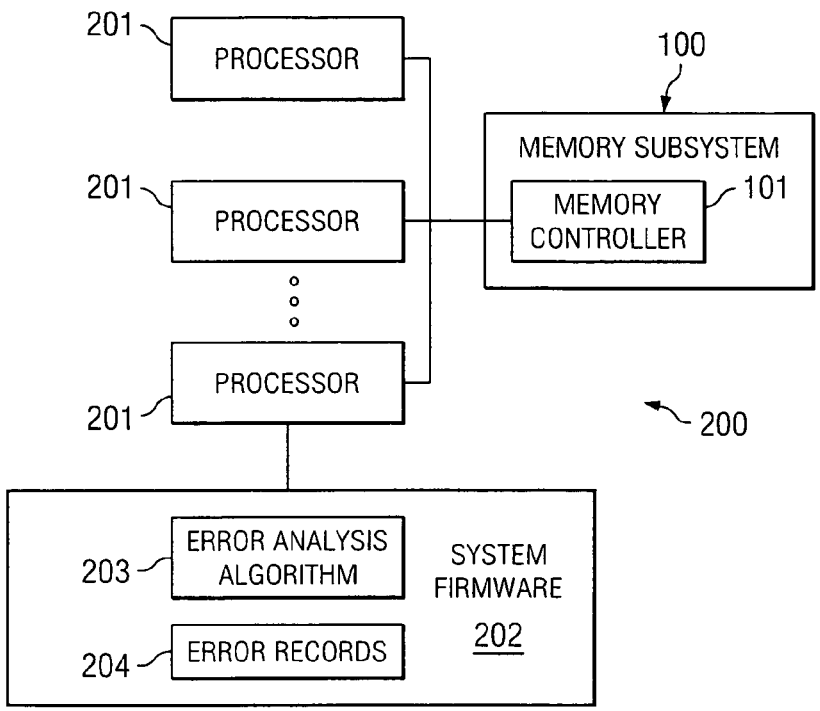
FIG. 2 depicts a computer system employing a software algorithm that records and analyzes memory errors to control the selective activation of erasure mode processing according to one representative embodiment.

Referring now to FIG. 2, computer system 200 employs page deallocation and erasure mode processing (using memory subsystem 100) in response to repeatable errors. Computer system 200 includes a plurality of processors 201 that store and retrieve cache lines using memory subsystem 100. When an occurrence of data corruption occurs upon the retrieval of a cache line, memory controller 101 detects the error and temporarily stores information related to the error (e.g., the physical memory address and corrupted bits/bytes). From time to time, error analysis algorithm 203 stored in system firmware 202 (or other suitable non-volatile memory or computer readable medium) is executed by a processor 201. Error analysis algorithm 203 polls memory controller 101 to obtain the information related to detected occurrences of data corruption. In response, error analysis algorithm 203 records the occurrences in error records 204. Error records 204 contain suitable information to enable repeated errors to be detected such as the bit location(s) exhibiting the error(s), the memory addresses of the error(s), the buses, the memory ranks, the DRAM banks used to communicate a corrupted cache line, and/or the like.

If multiple errors are observed at the same memory location at the bit level, it may be inferred that the multiple errors are not transient errors. Specifically, the probability of multiple transient errors occurring at the same bit location within a limited time frame is quite low. Instead, it may be inferred that a hardware issue is the cause of the multiple errors. Accordingly, error analysis algorithm 203 causes the page containing the memory location to be deallocated. In response to the deallocation, the operating system (not shown) maps the virtual addresses associated with the deallocated page of memory to a new page of memory. The deallocated page becomes unavailable for software processes thereby preventing further errors associated with access of faulty hardware.

As additional errors occur, error analysis algorithm 203 analyzes the errors to determine whether detected repeatable errors are associated with hardware components associated with a larger range of addresses. Error analysis algorithm 203 detects whether repeatable errors according to the same repeated pattern of data corruption have occurred in a respective domain more than a threshold number of times. If so, an erasure mode is activated for the domain to correct the repeated pattern of data corruption. The erasure mode is activated by setting a respective register of memory controller 101 to erase the bits associated with the repeated pattern of data corruption. By activating the erasure mode in an efficient manner, unnecessary memory deallocation operations will not occur because the relevant repeatable errors will be corrected using the erasure mode of the ECC algorithm.

The selection of threshold values used to control repeatable error handling may take into account a number of factors. For example, threshold values selected according to a predicted rate of transient data corruption will reduce undesired effects associated with memory deallocation operations and erasure mode ECC processing. The most frequent cause of transient data corruption is a particle strike. A particle strike involves the transfer of energy to a DRAM element thereby changing the state of the DRAM element and corrupting the bit associated with the DRAM element. DRAM vendors estimate that discrete DRAM elements exhibit an error rate of 5000 to 15000 failures in time (FIT), typically measured in billion device hours. Using 10,000 FIT as an average, a single DIMM can be expected to experience a transient error once every 114 days. In a memory subsystem with 32 DIMMs, approximately 100 errors can be expected per year. Accordingly, the observation of approximately 100 randomly occurring errors per year at random locations in a memory subsystem is not a cause for concern.

Some representative embodiments set a threshold value in an appropriate manner so that the occurrence of transient errors does not trigger page deallocation. In one representative embodiment, the threshold value is selected according to a defined observation period (e.g., twenty-four hours). That is, an expected number of transient errors is related to an observation period. The determination whether observed errors are indicative of transient errors or repeatable errors can be facilitated by defining a consistent observation period through appropriate deletion of old records. Also, the threshold value may be selected in reference to the amount of underlying memory. For the present discussion, it will be assumed that 32 DIMMs are used to implement the memory subsystem. A multiple value may be employed to enable differentiation between transient errors and repeatable errors. Specifically, if the observed number of errors exceeds the expected number of transient errors by an appropriate multiple (e.g., fifty), it may be concluded that an underlying hardware issue should be addressed. Given these considerations, if ten errors are detected within an observation period at the same physical bit location, the page containing that bit location is deallocated.

The selection of the threshold values for the erasure domains may be selected in a similar manner. Furthermore, the thresholds for various domains may be stepped to limit activation of the erasure mode processing to appropriate domains of the memory subsystem. In one representative embodiment, if ten repeatable errors having the same pattern of data corruption are observed for a domain associated with a memory bank, the erasure mode is activated for that memory bank. If twelve repeatable errors having the same pattern of data corruption are observed for a domain associated with a memory rank 107 (see FIG. 1), the erasure mode is activated for that memory rank. If fourteen repeatable errors having the same pattern of data corruption are observed for a domain associated with a DRAM bus 106, the erasure mode is activated for that memory DRAM bus. If sixteen repeatable errors having the same pattern of data corruption are observed for a domain associated with a quadrant bus 104, the erasure mode is activated for that memory quadrant bus.

Figure 3B:
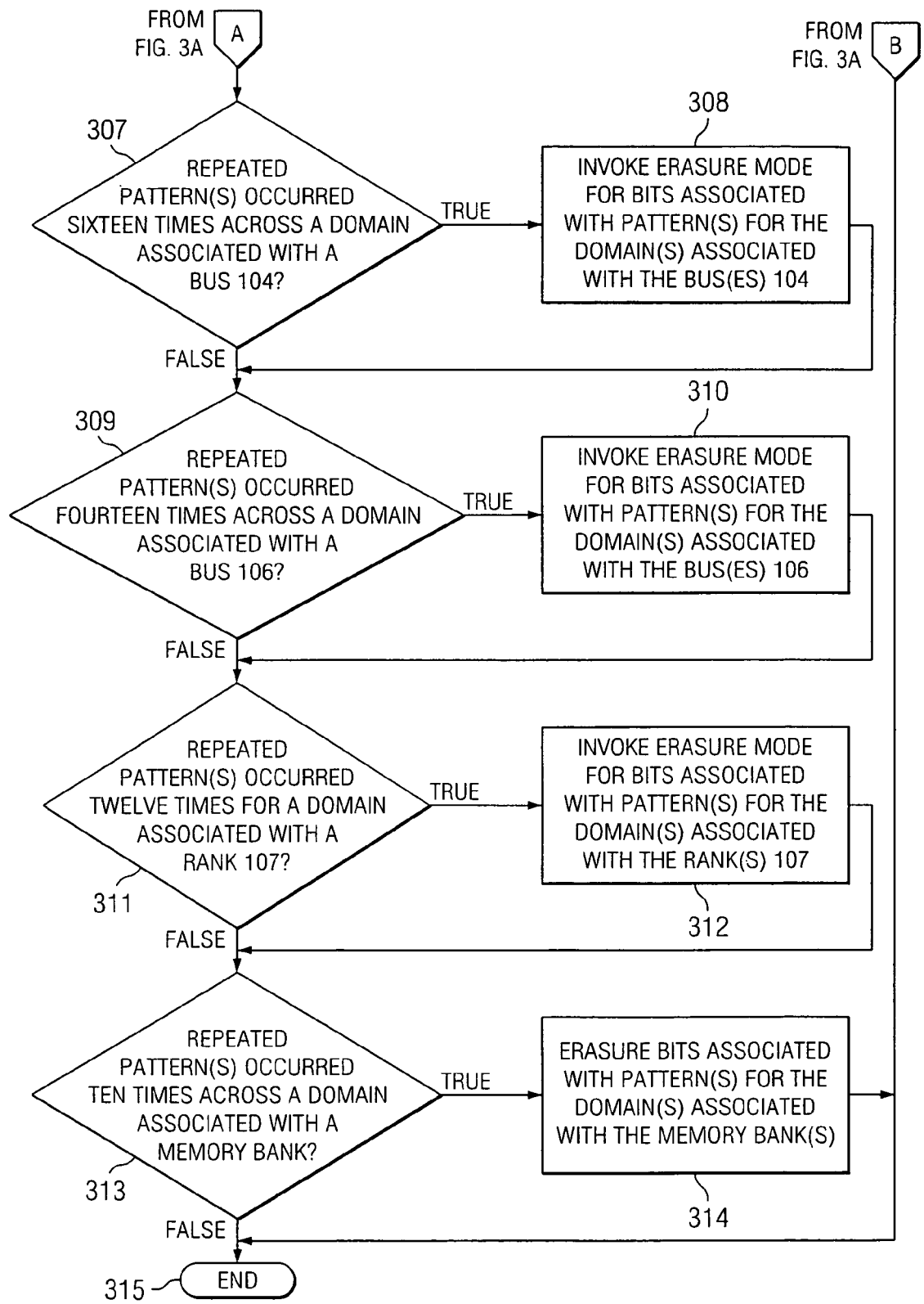

FIGS. 3A and 3B depict a flowchart for employing memory deallocation operations and erasure mode processing in response to data corruption associated with retrieval of data from memory. Portions of the flowchart may be implemented using software instructions or code within error analysis algorithm 203 (shown in FIG. 2). In step 301, data corruption is detected during retrieval of cache lines by controller 101. In step 302, error analysis algorithm 203 is executed and polls memory controller 101 for instances of data corruption. In step 303, error records 204 are updated by error analysis algorithm 203. Specifically, the occurrences of the data corruption are recorded by error analysis algorithm 203. The occurrences of data corruption as detailed in error records 204 are time-stamped or otherwise associated with suitable temporal information. Also, old records of data corruption are erased (e.g., records that are older than twenty-four hours). The purpose of erasing records according to temporal information is that the reliability of memory components is time-dependent. That is, an expected number of transient errors is related to an observation period. The determination whether observed errors are indicative of transient errors or repeatable errors is facilitated by defining a consistent observation period through appropriate deletion of old records.

In step 304, a logical comparison is made to determine whether any single physical memory location (at the bit level) exists that is associated with the ten or more errors. If so, the process flow proceeds to step 305 where the page(s) containing the location(s) are deallocated. In step 306, a logical comparison is made to determine whether a repeated pattern or patterns of data corruption are reflected in error records across multiple addresses. If not, the process flow proceeds to step 315 wherein the process ends. Otherwise, the process flow proceeds to step 307.

Beginning in step 307, a plurality of threshold values are used to activate erasure mode ECC processing for the various levels of domains of memory system 100. In step 307, a logical comparison is made to determine whether any repeated patterns of data corruption have occurred across a domain associated with buses 104-1 through 104-4 at least sixteen times. If the logical comparison is false, the process flow proceeds to step 309. If true, the process flow proceeds to step 308. In step 308, the erasure mode ECC processing is invoked for the bits associated with the pattern(s) for the particular domain(s) related to the respective bus(es) 104. Specifically, register(s) of memory controller 101 may be loaded to identify the potentially corrupted bits. In response thereto, when a cache line is retrieved from an affected domain, the ECC code words are decoded by assuming that the identified bits are corrupted.

In step 309, a logical comparison is made to determine whether any repeated patterns of data corruption have occurred across a domain associated with DRAM buses 106-1 through 106-8 at least fourteen times. If logical comparison is false, the process flow proceeds to step 313. If true, the process flow proceeds to step 310. In step 310, the erasure mode ECC processing is invoked for the bits associated with the pattern(s) for the particular domain(s) related to the respective DRAM bus(es) 106.

In step 311, a logical comparison is made to determine whether any repeated patterns of data corruption have occurred across a domain associated with memory ranks 107-1 through 107-32 at least twelve times. If the logical comparison is false, the process flow proceeds to step 313. If true, the process flow proceeds to step 312. In step 312, the erasure mode ECC processing is invoked for the bits associated with the pattern(s) for the particular domain(s) related to the respective memory rank(s) 107.

In step 313, a logical comparison is made to determine whether any repeated patterns of data corruption have occurred across a domain associated with the memory banks of memory subsystem 100 at least ten times. If the logical comparison is false, the process flow proceeds to step 315. If true, the process flow proceeds to step 314. In step 314, the erasure mode ECC processing is invoked for the bits associated with the pattern(s) for the particular domain(s) related to the respective memory bank(s).

In step 315, the process flow ends.

Figure 4:
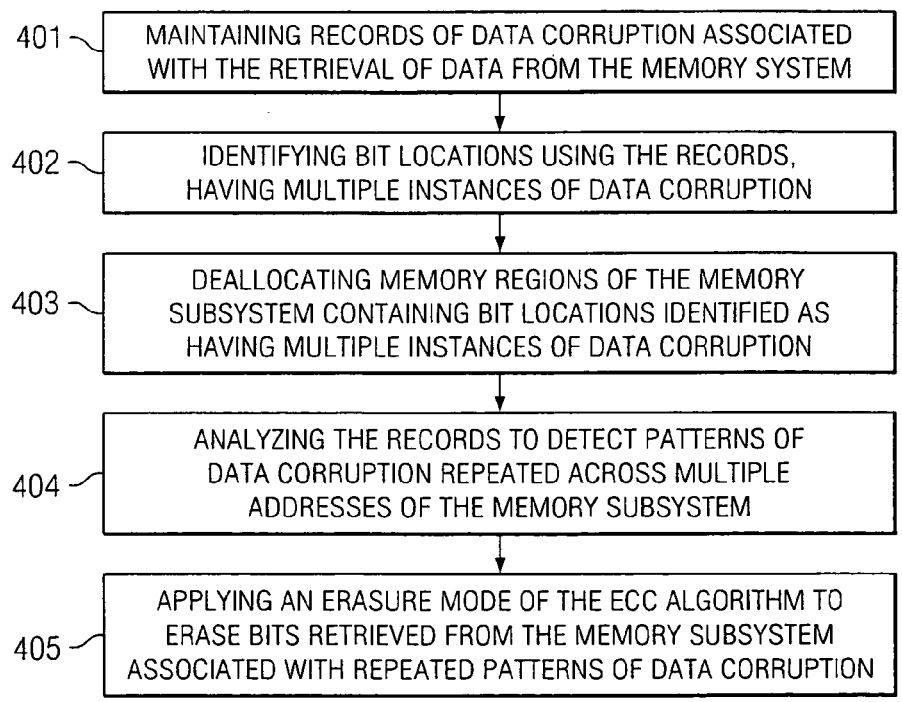
FIG. 4 depicts another flowchart according to one representative embodiment.

FIG. 4 depicts another flowchart for controlling application of an error correction code (ECC) algorithm in a memory subsystem according to one representative embodiment. In step 401, records of data corruption associated with retrieval of data from the memory subsystem are maintained. In step 402, bit locations having multiple instances of data corruption are identified using the records. In step 403, memory regions of the memory subsystem containing bit locations identified as having multiple instances of data corruption are deallocated. In step 404, the records are analyzed to detect patterns of data corruption repeated across multiple addresses of the memory subsystem. In step 405, an erasure mode of the ECC algorithm is applied to erase bits retrieved from the memory subsystem associated with repeated patterns of data corruption.

Some representative embodiments enable a computer system to be resilient against memory errors. By efficiently differentiating between transient errors and repeatable errors, some representative embodiments appropriately invoke page deallocation operations and erasure mode ECC processing to prevent repeatable errors from causing an unrecoverable error. Furthermore, by differentiating between isolated repeatable errors and repeatable errors associated greater ranges of addresses, some representative embodiments reduce adverse affects of page deallocation operations and erasure mode ECC processing. Specifically, system resources are not consumed by page deallocation operations. Also, system performance is not appreciably affected by invoking erasure mode ECC processing in response to transient errors or isolated repeatable errors.

What is claimed is:

1. A computer readable medium, comprising executable instructions for controlling a memory subsystem, said computer readable medium comprising:
   code for recording occurrences of data corruption in data retrieved from said memory subsystem;
   code for determining whether bit locations within said memory subsystem are associated with multiple occurrences of data corruption;
   code for deallocating, in response to said code for determining, memory regions containing bit locations associated with multiple occurrences of data corruption;
   code for analyzing patterns of data corruption repeated across multiple addresses of said memory subsystem; and
   code for controlling application of an error correction code (ECC) algorithm by said memory subsystem to erase bits associated with a repeated bit pattern, detected by said code for analyzing, from data retrieved from said memory subsystem.

2. The computer readable medium of claim 1 wherein said memory subsystem comprises a plurality of domains and said code for controlling causes said ECC algorithm to erase bits independently in each domain of said plurality of domains.

3. The computer readable medium of claim 2 wherein said code for controlling determines whether a predetermined number of instances of a repeated bit pattern have occurred within one of said plurality of domains before causing said ECC algorithm to erase bits of data retrieved from said one of said plurality of domains.

4. The computer readable medium of claim 3 wherein said memory subsystem comprises a plurality of hierarchical levels and said code for controlling employs a plurality of tiered threshold values to control application of said ECC algorithm to erase bits of data retrieved from each respective hierarchical level.

5. The computer readable medium of claim 2 wherein said code for controlling identifies one of a plurality of buses for erasure of bits using said ECC algorithm.

6. The computer readable medium of claim 2 wherein said code for controlling identifies one of a plurality of memory ranks for erasure of bits using said ECC algorithm.

7. The computer readable medium of claim 2 wherein said code for controlling identifies one of a plurality of discrete memory banks for erasure of bits using said ECC algorithm.

8. The computer readable medium of claim 1 wherein said ECC algorithm corrects an occurrence of a single-byte transient error in a cache line retrieved from said memory subsystem and, in said erasure mode, corrects an additional single-byte repeatable error corresponding to erased bits.

9. The computer readable medium of claim 1 wherein said code for controlling loads a register of a memory controller to identify said bits associated with a repeated bit pattern detected by said code for analyzing.

10. The computer readable medium of claim 1 wherein said code for controlling loads a register of a memory controller to identify a single-byte to be erased using said ECC algorithm.

11. The computer readable medium of claim 1 wherein said code for recording erases records of data corruption that are older than a predetermined age.

12. A method for controlling application of an error correction code (ECC) algorithm in a memory subsystem, comprising:
   maintaining records of data corruption associated with retrieval of data from said memory subsystem;
   identifying bit locations, using said records, having multiple instances of data corruption;
   deallocating memory regions of said memory subsystem containing bit locations identified as having multiple instances of data corruption;
   analyzing said records to detect patterns of data corruption repeated across multiple addresses of said memory subsystem; and
   applying an erasure mode of said ECC algorithm to erase bits retrieved from said memory subsystem associated with repeated patterns of data corruption.

13. The method of claim 12 wherein said maintaining comprising:
   erasing records of data corruption than are older than a predetermined age.

14. The method of claim 12 wherein said memory subsystem comprises a plurality of domains, wherein said applying applies said erasure mode of said ECC algorithm independently between said plurality of domains.

15. The method of claim 12 further comprising:
determining whether a number of instances of data corruption have occurred for data retrieved from a subcomponent of memory subsystem before applying said erasure mode of said ECC algorithm to data retrieved from said subcomponent.

16. The method of claim 15 wherein a plurality of tiered threshold values are employed by said determining for respective subcomponents of memory subsystem.

17. A system, comprising:
memory controller means for storing and retrieving cache lines from memory, said memory controller applying an error correction code (ECC) algorithm to data retrieved from said memory, wherein said ECC algorithm corrects at least one transient error of a cache line and, in an erasure mode, at least one repeatable error of said cache line in addition to said transient error;
means for recording occurrences of errors in retrieved cache lines detected by said memory controller means;
means for identifying bit locations in said memory that have exhibited multiple errors;
means for deallocating memory regions in response to said means for identifying;
means for detected patterns of data corruption repeated across multiple addresses of said memory; and
means for activating said erasure mode of said memory controller means to erase a pattern of data corruption in response to said means for detecting.

18. The system of claim 17 wherein said means for recording erases records of errors that are older than a predetermined age.

19. The system of claim 17 wherein said means for activating determines whether a repeated pattern has occurred more than a threshold value before activating said erasure mode.

20. The system of claim 19 wherein said threshold value varies depending upon a subcomponent of said memory associated with a respective repeated pattern of errors.

21. A computer readable medium, comprising executable instructions for controlling application of an error correction code (ECC) algorithm in a memory subsystem, said computer readable medium comprising:
code for recording occurrences of data corruption in data retrieved from said memory subsystem;
code for analyzing said occurrences of data corruption to detect a repeated bit pattern of data corruption across different addresses of said memory subsystem; and
code for controlling application of said ECC algorithm to erase bits associated with a repeated bit pattern, detected by said code for analyzing, from data retrieved from said memory subsystem.

22. The computer readable medium of claim 21 further comprising:
code for identifying one of a plurality of domains of said memory subsystem that is associated with said detected repeated bit pattern.

23. The computer readable medium of claim 22 wherein said code for identifying identifies one of a plurality of buses.

24. The computer readable medium of claim 22 wherein said code for identifying identifies one of a plurality of memory ranks.

25. The computer readable medium of claim 22 wherein said code for identifying identifies one of a plurality of discrete memory banks.

26. The computer readable medium of claim 21 wherein said ECC algorithm corrects an occurrence of a single-byte transient error in a cache line retrieved from said memory subsystem and, in said erasure mode, corrects an additional single-byte repeatable error corresponding to said erased bits.

27. The computer readable medium of claim 21 wherein said code for controlling loads a register of a memory controller to identify said bits associated with detected repeated bit pattern.

28. The computer readable medium of claim 21 wherein said code for controlling loads a register to identify a single-byte to be erased using said ECC algorithm.

29. A system, comprising:
memory means for storing data;
memory controller means for storing caches lines in and retrieving cache lines from said memory means, wherein said memory controller means applies an error correction code (ECC) algorithm to said cache lines to erase predetermined bit locations within said cache lines;
means for recording instances of data corruption in cache lines detected by said memory controller means;
means for differentiating said instances of data corruption according to transient errors, repeatable errors associated with a memory bank, repeatable errors associated with a memory rank, repeatable errors associated with a bus, repeatable errors associated with all of said memory means; and
means for activating an erasure mode for said ECC algorithm for a domain of said memory means in response to said means for differentiating.

30. The system of claim 29 further comprising:
means for removing instances of data corruption from said means for recording when said removed instances have been stored more than a predetermined amount of time.

31. The system of claim 29 wherein said memory controller corrects a single-byte transient error in a cache line and additionally, in said erasure mode, corrects a single-byte repeatable error in said cache line using said ECC algorithm.

* * * * *